United States Patent
Liu

(10) Patent No.: US 9,948,362 B2
(45) Date of Patent: Apr. 17, 2018

(54) SYSTEM AND METHOD FOR 3D IMAGING USING A MOVING MULTIPLE-INPUT MULTIPLE-OUTPUT (MIMO) LINEAR ANTENNA ARRAY

(71) Applicant: Mitsubishi Electric Research Laboratories, Inc., Cambridge, MA (US)

(72) Inventor: Dehong Liu, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 547 days.

(21) Appl. No.: 14/594,316

(22) Filed: Jan. 12, 2015

(65) Prior Publication Data

US 2016/0204840 A1    Jul. 14, 2016

(51) Int. Cl.
*H04B 7/04* (2017.01)
*G01S 13/90* (2006.01)
*H04B 7/0413* (2017.01)
*G01S 13/00* (2006.01)

(52) U.S. Cl.
CPC ........ *H04B 7/0413* (2013.01); *G01S 13/9035* (2013.01)

(58) Field of Classification Search
CPC .......... G01S 13/88; G01S 13/89; G01S 13/90; G01S 13/9035; G01S 13/02; G01S 13/06; G01S 13/08; G01S 13/32; G01S 13/34; G01S 13/343; G01S 13/50; G01S 13/52; G01S 13/56; G01S 13/882; H04B 7/02; H04B 7/04; H04B 7/0413
See application file for complete search history.

(56) References Cited

U.S. PATENT DOCUMENTS

| | | | |
|---|---|---|---|
| 6,919,839 B1 * | 7/2005 | Beadle | G01S 13/90 |
| | | | 342/118 |
| 7,928,893 B2 | 4/2011 | Baraniuk et al. | |
| 8,471,759 B2 | 6/2013 | Sun et al. | |
| 8,570,210 B1 * | 10/2013 | Fonder | G01S 13/02 |
| | | | 342/25 B |
| 9,541,638 B2 * | 1/2017 | Jansen | G01S 13/343 |

(Continued)

OTHER PUBLICATIONS

Xu et al., "Compressive Sensing MIMO Radar Imaging Based on Inverse Scattering Model"; ICSP2010 Proceedings; pp. 1999-2002; IEEE publication 978-1-4244-5900-1/10/$26.00; copyright in the year 2010.*

(Continued)

*Primary Examiner* — Bernarr E Gregory
(74) *Attorney, Agent, or Firm* — Gene Vinokur; James McAleenan; Hironori Tsukamoto

(57) ABSTRACT

A method generates a three-dimensional (3D) scene image of a scene using a MIMO array including a set of antenna by first selecting a subsets of the antennas as transmit antennas and receive antennas. Radio frequency (RF) signal are transmitted into the scene using the subset of transmit antennas while the MIMO array is moving at a varying velocity. The RF signal are received at the subset of receive antennas as MIMO data, which is aligned and regularized. Then, a compressive sensing (CS)-based reconstruction procedure is applied to the aligned MIMO data to generate the 3D image of the scene.

11 Claims, 4 Drawing Sheets

(56) References Cited

U.S. PATENT DOCUMENTS

| | | | | |
|---|---|---|---|---|
| 2011/0140949 | A1* | 6/2011 | Lee | G01S 13/34 342/28 |
| 2011/0279669 | A1* | 11/2011 | Longstaff | G01S 13/882 348/135 |
| 2012/0274499 | A1* | 11/2012 | Chang | G01S 13/89 |
| 2014/0055297 | A1* | 2/2014 | Beeri | G01S 13/89 342/21 |
| 2015/0138010 | A1* | 5/2015 | Bikhazi | G01S 13/56 342/28 |
| 2015/0198713 | A1* | 7/2015 | Boufounos | G01S 13/89 342/22 |

OTHER PUBLICATIONS

Yao et al., "MIMO Radar Using Compressive Sampling"; IEEE Journal of Selected Topics in Signal Processing; vol. 4, No. 1; Feb. 2010; pp. 146-163.*

Zhao et al., "Robust Compressive Multi-input-multi-output Imaging"; IET Radar Sonar Navigation; vol. 7, No. 3; year 2013; pp. 233-245.*

Kim et al., "Sparse Arrays, MIMO, and Compressive Sensing for GMTI Radar"; Proceedings of Asilomar 2014; pp. 849-853; IEEE publication 978-1-4799-8297-4/14/$31.00; copyright in the year 2014.*

G. Fornaro, F. Serafino, and F. Soldovieri, "Three-dimensional focusing with multipass SAR data," IEEE Trans. Geoscience and Remote Sensing, vol. 41(3), pp. 507-517, Mar. 2003.

X. X. Zhu and R. Bamler, "Tomographic SAR inversion by L1-norm regularization—the compressive sensing approach," IEEE Trans. Geoscience and Remote Sensing, vol. 48(10), pp. 3839-3846, Oct. 2010.

J. M. Lopez-Sanchez and J. Fortuny-Guasch, "3-D imaging using range migration techniques," IEEE Trans. antennas and propagation, vol. 48(5), pp. 728-737, May 2000.

G. Krieger, "MIMO-SAR: Opportunities and pitfalls," IEEE Trans. Geoscience and Remote Sensing, vol. 52(5), pp. 2628-2645, 2014.

X. Zhuge and A. G. Yarovoy, "A sparse aperture MIMO-SAR-based UWB imaging system for concealed weapon detection," IEEE Trans. Geoscience and Remote Sensing, vol. 49(1), pp. 509-518, 2011.

Z. Yang, M. Xing, G. Sun, and Z. Bao, "Joint multichannel motion compensation method for MIMO SAR 3D imaging," International Journal of Antennas and Propagation, 2014.

* cited by examiner

SYSTEM AND METHOD FOR 3D IMAGING USING A MOVING MULTIPLE-INPUT MULTIPLE-OUTPUT (MIMO) LINEAR ANTENNA ARRAY

RELATED APPLICATION

This U.S. Application is related to U.S. application Ser. No. 14/202,449, "System and Method for 3D SAR Imaging using Compressive Sensing with Multi-Platform, Multi-Baseline and Multi-PRF Data," filed by Liu et al. on Mar. 10, 2014, and incorporated herein by reference. That Application also describes 3D SAR imaging using the compressive sensing.

FIELD OF THE INVENTION

This invention relates generally to 3D imaging, and more particular to using a MIMO array of antennas, and compressive sensing (CS)-based 3D image reconstruction.

BACKGROUND OF THE INVENTION

A conventional single-channel virtual antenna array system makes use of wideband radio frequency (RF) signals and a large synthetic aperture to generate two-dimensional (2D) range-azimuth images. The 2D azimuth images, without any elevation information, are a projection of the 3D scene onto the 2D range-azimuth plane. Therefore, the 3D structure of the scene, such as a 3D terrain, is not preserved after the projection. In addition, this projection may cause several artifacts, such as layover and shadowing. In layover artifacts, several terrain patches with different elevation angles are mapped into the same range-azimuth cell. In shadowing artifacts, certain areas are not visible by the array imaging system because of occluding structures. These artifacts cannot be resolved by a single baseline observation, even using interferometric array imaging techniques.

In order to perform 3D imaging, multi-baseline observations are necessary in the elevation dimension. The multi-baseline observations can be acquired either by multiple passes of a single-channel platform or a single pass of a multiple-channel platform.

A moving MIMO system, as a multiple-channel platform with 3D imaging capability, has the following advantages. First, the degrees of freedom are greatly increased by the multiple antennas of the MIMO array. Second, the moving MIMO platform can provide much more transmitter-receiver combinations to satisfy cross-track sampling, resulting significantly improved elevation resolution.

However, the moving MIMO array platform also suffers from several tradeoffs. First, the total number of simultaneous transmitting channels are restricted to avoid self interference. For conventional MIMO array, the transmitting elements are typically fixed. Second, the spatial location of the moving MIMO array are subject to motion errors. This can cause ambiguity and defocus when left uncompensated.

As shown in FIG. 1, a conventional MIMO array system 110, which generally moves 120 along an azimuth (y) direction, generates a 3D image of a scene with point scatterers 130 at different elevations. The magnitude of the velocity vector is constant, and the direction is in a straight line. The array includes fixed receivers (x, ♦) and fixed transmitters (x) typically at each end of the array.

FIG. 2 shows a conventional 3D imaging method. Here, the MIMO array is moving at a constant velocity, and the transmitters and receivers are fixed. That is, all transmitters and receivers of the array are the same while transmitting and receiving. The transmitters emit radio frequency (RF) signal onto a scene, which are reflected and received by the receivers. The data 211 corresponding to the received RF signals 210 are used to generate 220 2D images 221 that are aligned 230. Then, 3D image reconstruction is applied to the aligned image to obtain the 3D image 241.

SUMMARY OF THE INVENTION

The embodiments of the invention provide a system and method for 3D imaging using a moving multiple-input multiple-output (MIMO) linear array with a set of antennas. The moving MIMO array uses random transmitting channels and applies compressive sensing (CS)-based imaging to deal with the 3D imaging problem taking into account the random channels and motion errors.

In particular, the embodiments use an across-track linear MIMO array moving along an idealized straight track but with a varying velocity and across-track jitter.

Considering the restriction on the transmit channels, the total number of transmit channels is limited as in a conventional moving MIMO array. However, according to the embodiments of the invention, the subset of transmit antennas and receive antennas are randomly selected. This random selection provides more degrees of freedom in MIMO data collection with improved imaging performance.

Due the velocity variation of the MIMO array, the effective virtual array is spatially uniformly distributed with random jitters in azimuth and range directions. The randomness ensures that the linear measurements are incoherent and fully capture the scene information. Thus, the measurement can be inverted by the non-linear compressive sensing based reconstruction process using appropriate regularization to recover the scene under observation.

Comparing to the idealized full channel operation, The collected data miss random transmitting channels due to the channel restriction, and are sampled at non-uniform spatial locations due to jitters. The collected data are treated in its entirety and compressive sensing based iterative 3D imaging is used to generate a high resolution 3D image.

The system provides several advantages over conventional systems. First, the system provides more degrees of freedom in transmitting channels than conventional moving MIMO system. Second, the CS-based method deals with random transmitting channels and motion errors to enable suppression of the ambiguity caused by the velocity variations and location jitter leading to a higher resolution image than those obtained using conventional methods. Third, the system system can perform 3D imaging with fewer channels, which saves time and expense for data collection and provides imaging performance comparable to full channel operation. The reduction of total number channels can increase the size of the scene being imaged or provide a higher resolution.

DETAILED DESCRIPTION OF THE PREFERRED EMBODIMENTS

The embodiments of our invention provide a system and method for 3D imaging using a moving multiple-input multiple-output (MIMO) linear array with a set of antennas. The moving MIMO array uses random transmitting channels and applies compressive sensing (CS)-based imaging to deal with the 3D imaging problem taking into account the random channels and motion errors.

Figure 1:
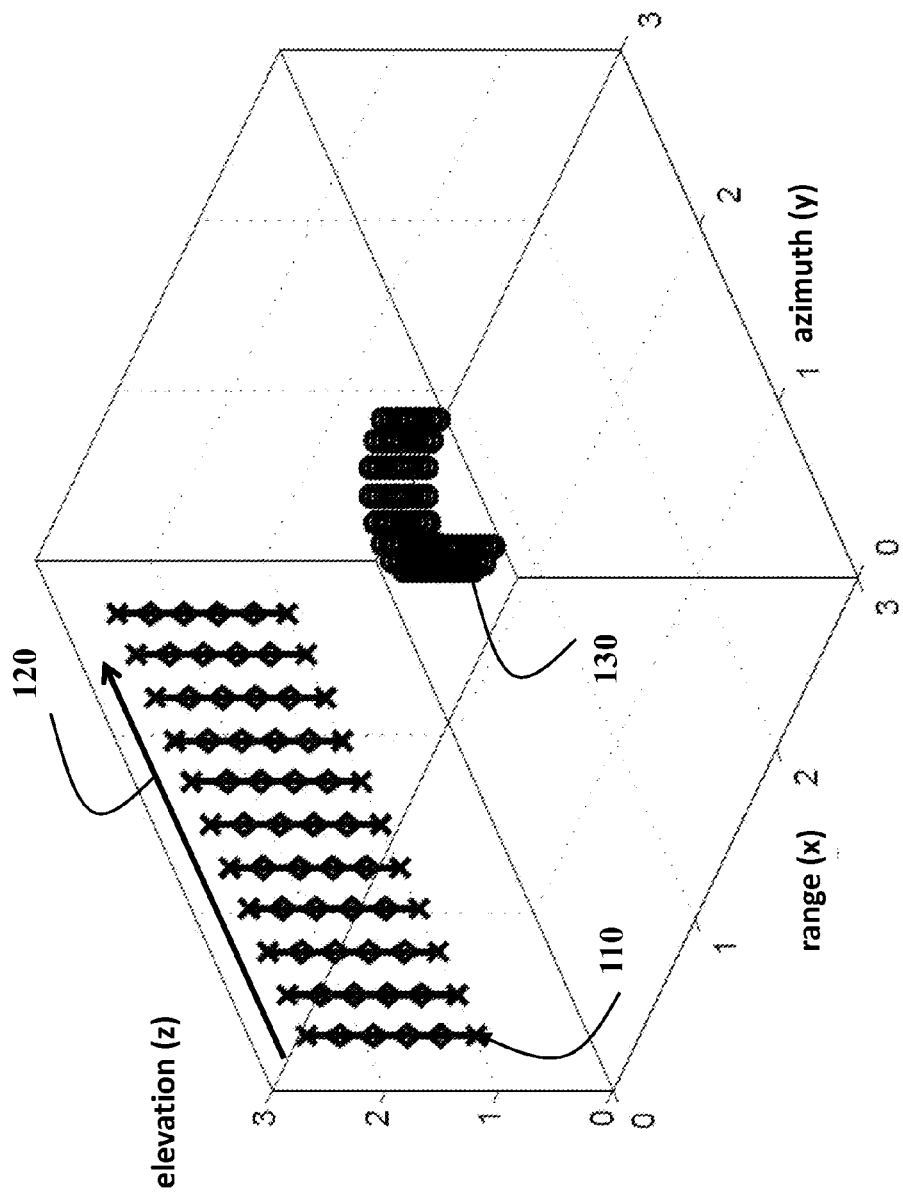
FIG. 1 is a schematic of a conventional MIMO radar imaging.
Figure 2:
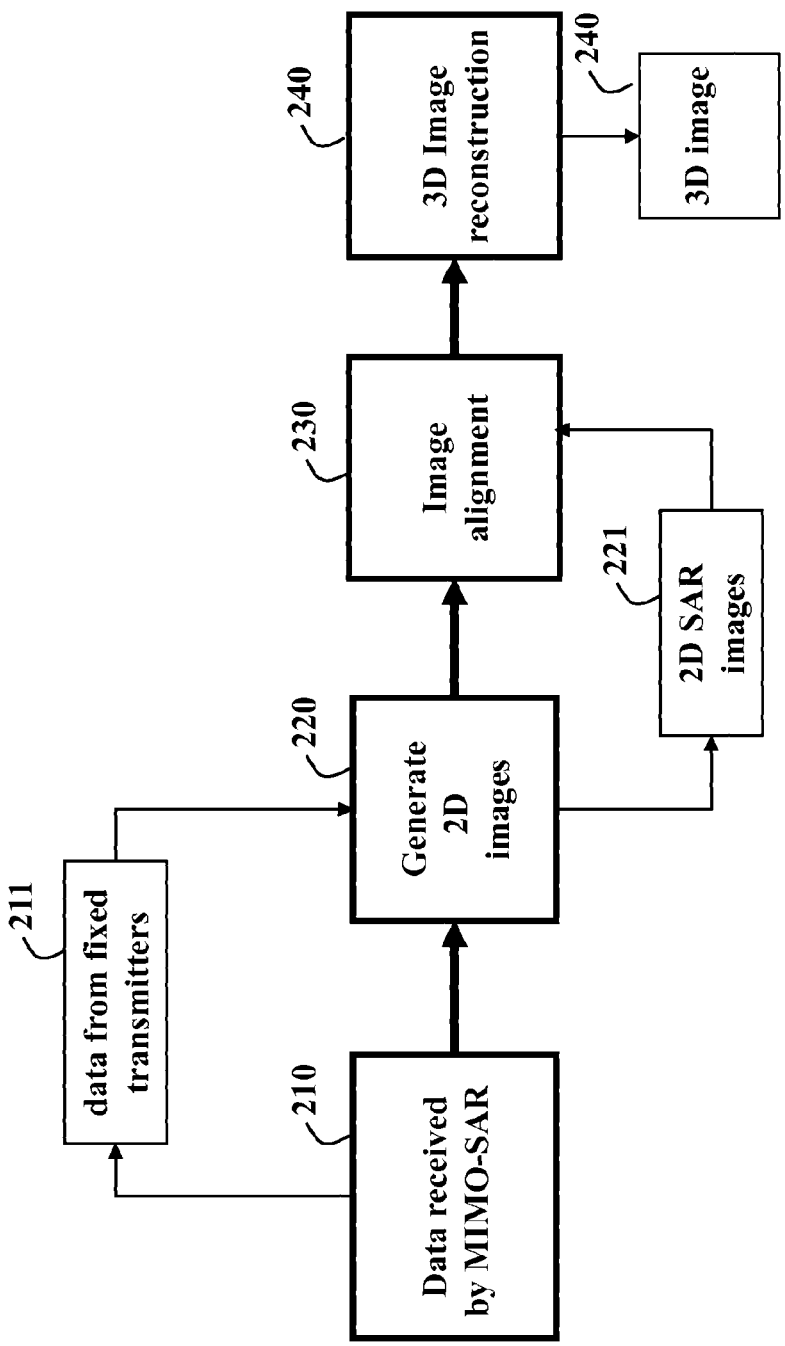
FIG. 2 is a block diagram of a conventional moving MIMO system and method.
Figure 3:
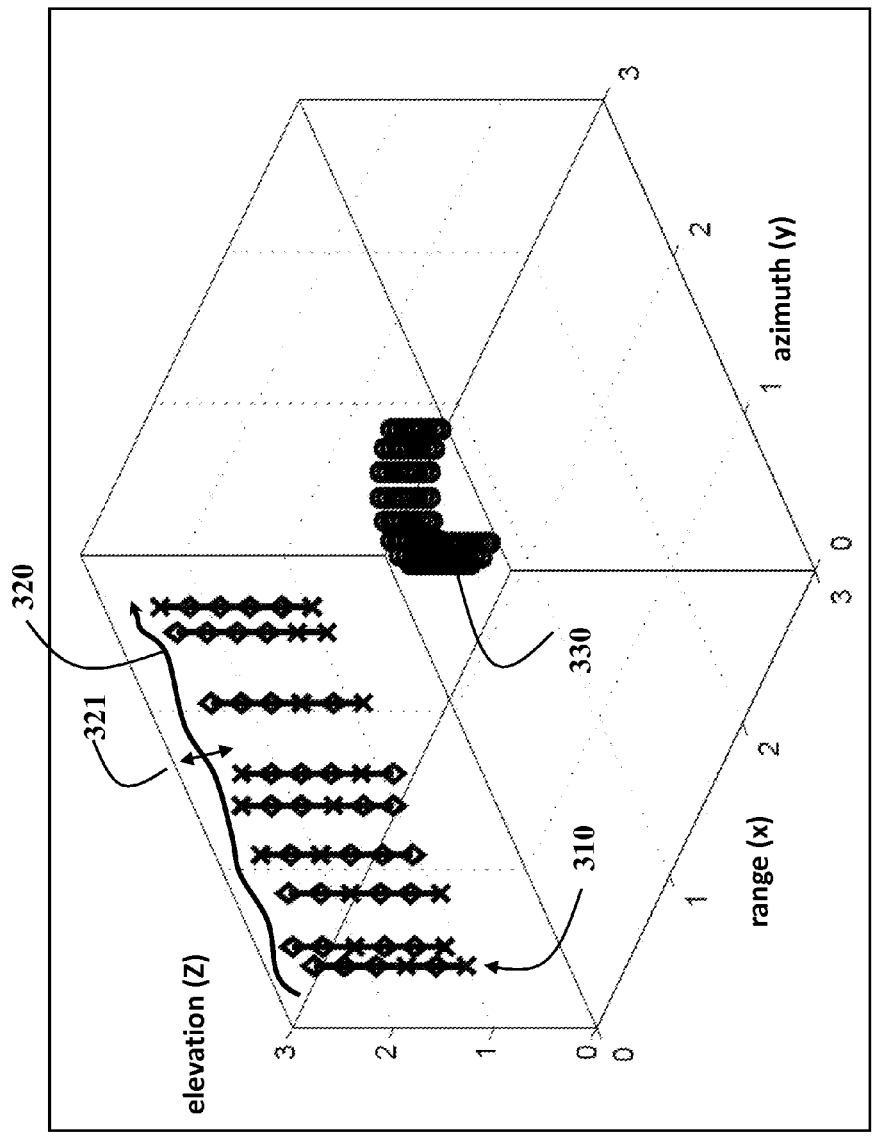
FIG. 3 is a schematic of a compressive sensing based 3D imaging according to embodiments of the invention.

As shown in FIG. 3, we consider data collected by a moving 320 MIMO array 310. An orientation of the array is parallel to the elevation (z) direction. The array includes subsets of randomly selected transmit (x), and receive (x, ♦) antennas. Note, the transmit antennas can also be used to receive the RF signals after the signals have been transmitted. The array can be subject to random cross-track jitter in the azimuth and elevation directions, which are corrected by embodiments of the invention.

Figure 4:
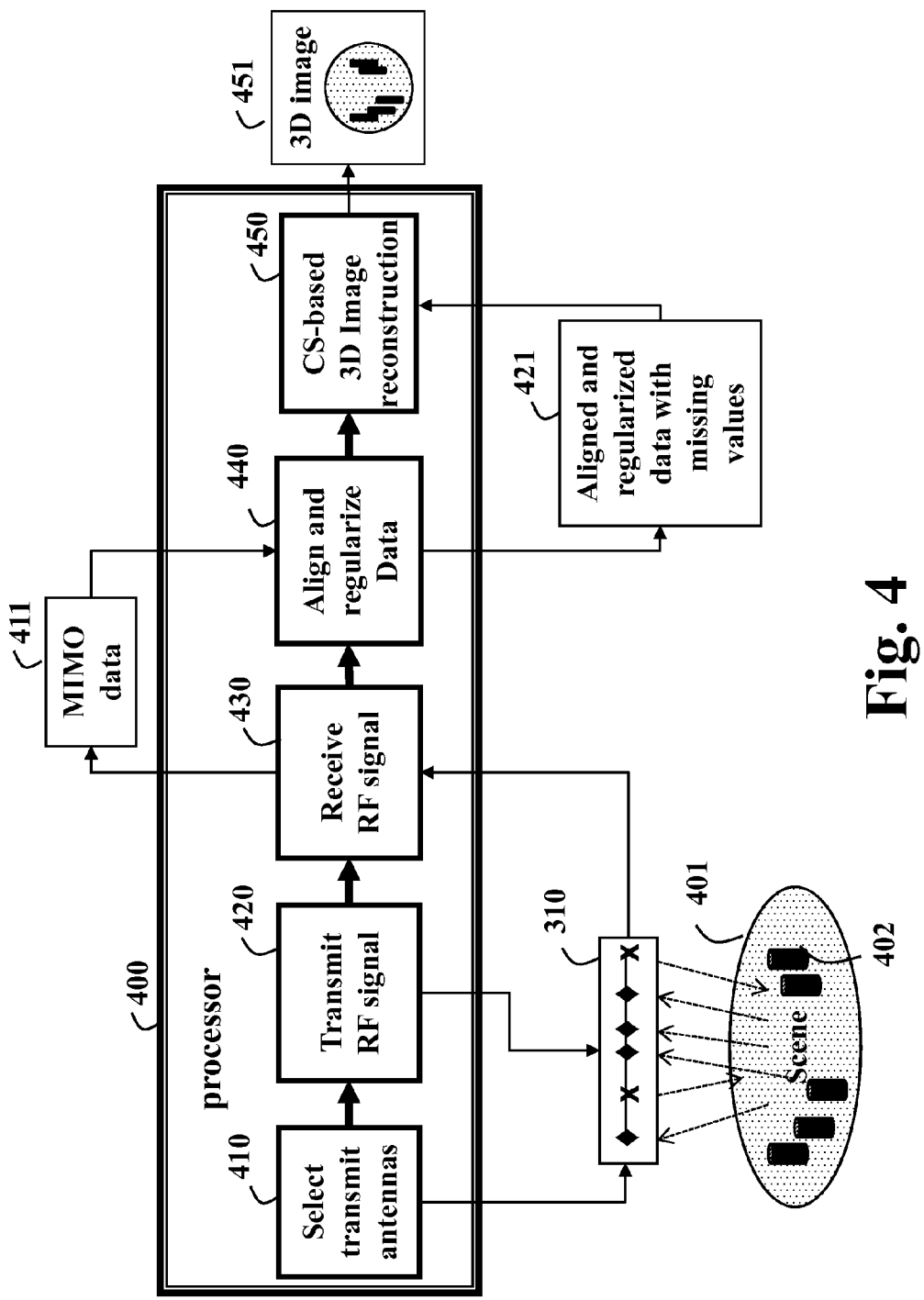
FIG. 4 is a block diagram of a system and method for generating a 3D image using a moving MIMO array according to the embodiments of the invention.

FIG. 4 shows the 3D imaging method according to embodiments of the invention. The method selects 410 subsets of the set of antennas 310 as transmit antennas and receive antennas. Then, radio frequency (RF) signals are transmitted onto the scene 401 including reflectors 402 using the subset of transmit antennas while the MIMO array is moving at a varying velocity. While moving the MIMO array is subject to jitter, hence both the magnitude and the direction of the velocity varies.

The reflected RF signals are received at the subset of receive antennas as MIMO data 411, which are aligned 440 to produce aligned MIMO data. The MIMO data are sampled uniformly in time. A compressive sensing (CS)-based reconstruction procedure is then applied 450 to the aligned MIMO data to generate the 3D image 451 of the scene.

The above steps can be performed in a processor 400 connected to memory for storing the data 411 and 421, input/output interfaces and the antennas by buses as known in the art.

In general, all the antennas can transmit and receive data. However, to avoid interference between the transmitted signals, the transmitting channels are restricted for each RF pulse transmission. For conventional moving MIMO system, these transmitting channels are fixed to certain transmit antennas. In our system, we assume orthogonal signals are transmitted by, for example two, transmit antenna randomly selected from the set of all the available antennas, providing more flexibility and potential better imaging performance.

The pulse repetition frequency (PRF) is fixed during the movement of the MIMO array. However, due to the spatial jitter of the MIMO array, the effective spatial sampling locations are not uniform in a straight line.

The CS-based image reconstruction fills in missing data using an iterative procedure that exploits the sparsity of the scene, i.e., most data elements are zero, and then performs fast range-migration imaging on the entire (complete or full) data.

Results demonstrate that using our system and CS-based method, we are able to suppress the ambiguity caused by velocity variations and location jitter, leading to a higher resolution image than those using conventional systems and methods. In addition, we can perform 3D imaging with less channels than conventional MIMO systems, which saves time and expense for data collection and provides imaging performance comparable to full channel operation. The reduction of total number channels also provides potential to image a larger scene or a higher resolution.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A method for generating a three-dimensional (3D) image of a scene using a MIMO array including a set of antennas, comprising steps of:
    selecting at least one subset of the antennas as a subset of transmit antennas and a subset of receive antennas;
    transmitting radio frequency (RF) signal into the scene using the subset of transmit antennas while the MIMO array is moving at a varying velocity;
    receiving the RF signal reflected by the scene at the subset of receive antennas as MIMO data;
    aligning and regularizing the MIMO data;
    applying a compressive sensing (CS)-based reconstruction procedure to the aligned MIMO data to generate the 3D image of the scene.

2. The method of claim 1, wherein the MIMO data are sampled uniformly in time.

3. The method of claim 1, wherein an orientation of the MIMO array is fixed.

4. The method of claim 1, wherein the MIMO array is subject to random jitter in azimuth and elevation directions.

5. The method of claim 1, wherein all data are processed as an entirety by compressive sensing (CS)-based reconstruction procedure.

6. The method of claim 1, wherein the compressive sensing method is an iterative reconstruction method.

7. The method of claim 1, wherein the varying velocity distributes the array spatially and uniformly with random jitters in azimuth and range directions.

8. The method of claim 1, wherein the MIMO array is linear.

9. The method of claim 1, wherein the RF signals transmitted are orthogonal.

10. The method of claim 1, further comprising:
    filling in missing data using an iterative procedure by exploiting sparsity of the scene.

11. A system for generating a three-dimensional scene (3D) image of a scene using a MIMO array including a set of antennas, comprising:
    a subset of receive antennas configured to receive the RF signal into the scene using while the MIMO array is moving at a varying velocity;
    another subset of receive antennas configured to receive the RF signal reflected by the scene as MIMO data;
    a processor configured to align and regularize the MIMO data and apply a compressive sensing (CS)-based reconstruction procedure to the aligned MIMO data to generate the 3D image of the scene.

* * * * *